United States Patent [19]
Haas et al.

[11] Patent Number: 6,073,764
[45] Date of Patent: Jun. 13, 2000

[54] COMPACT DISC STORAGE DEVICE

[76] Inventors: Robert S. Haas; Jo-Ann Haas, both of 1030 SW. 128 Dr., Davie, Fla. 33325

[21] Appl. No.: 09/323,982

[22] Filed: Jun. 1, 1999

[51] Int. Cl.$^7$ .................................................. B65D 85/57
[52] U.S. Cl. ..................... 206/308.1; 206/425; 211/41.12
[58] Field of Search ............................. 206/307, 308.1, 206/309, 312, 425; 211/41.12

[56] References Cited

U.S. PATENT DOCUMENTS

| | | | |
|---|---|---|---|
| 4,781,292 | 11/1988 | Sacherman et al. | 206/309 |
| 5,027,950 | 7/1991 | Gutierrez et al. | 206/425 |
| 5,069,347 | 12/1991 | Newman | 211/41 |
| 5,201,414 | 4/1993 | Kaszubinski | 206/309 |
| 5,344,015 | 9/1994 | Carlin et al. | 206/449 |
| 5,464,091 | 11/1995 | Callahan et al. | 206/45.15 |
| 5,624,027 | 4/1997 | Ayers et al. | 206/308.3 |
| 5,924,564 | 7/1999 | Lin | 206/308.1 |

*Primary Examiner*—David T. Fidei
*Attorney, Agent, or Firm*—Robert M. Downey, P.A.

[57] ABSTRACT

A storage device for holding a collection of individual units of media such as, but not limited to, compact discs, DVD's, CD-roms, mini discs, video game cassettes, cassette tapes, VCR tapes, microcassettes, and the like, includes a frame structure having first and second longitudinal frame members maintained in spaced apart, parallel relation and a plurality of carriers supported transversely between the longitudinal frame members in a series of rows. The carriers each include a base and front and rear transparent panels extending upwardly from the base in spaced parallel relation to one another for holding one or more of the media units therebetween in a generally upright position. The carriers are normally maintained in a rearwardly inclined position and are independently movable, in a flipping motion, about a transverse pivot axis through a range of movement between the rearwardly inclined position and a forwardly inclined position. As the carriers in each row are flipped forwardly, the entire front covers of the media units are visibly exposed in the next successive row, thereby providing for easy visual identification and location of each of the individual media units stored within the device.

18 Claims, 4 Drawing Sheets

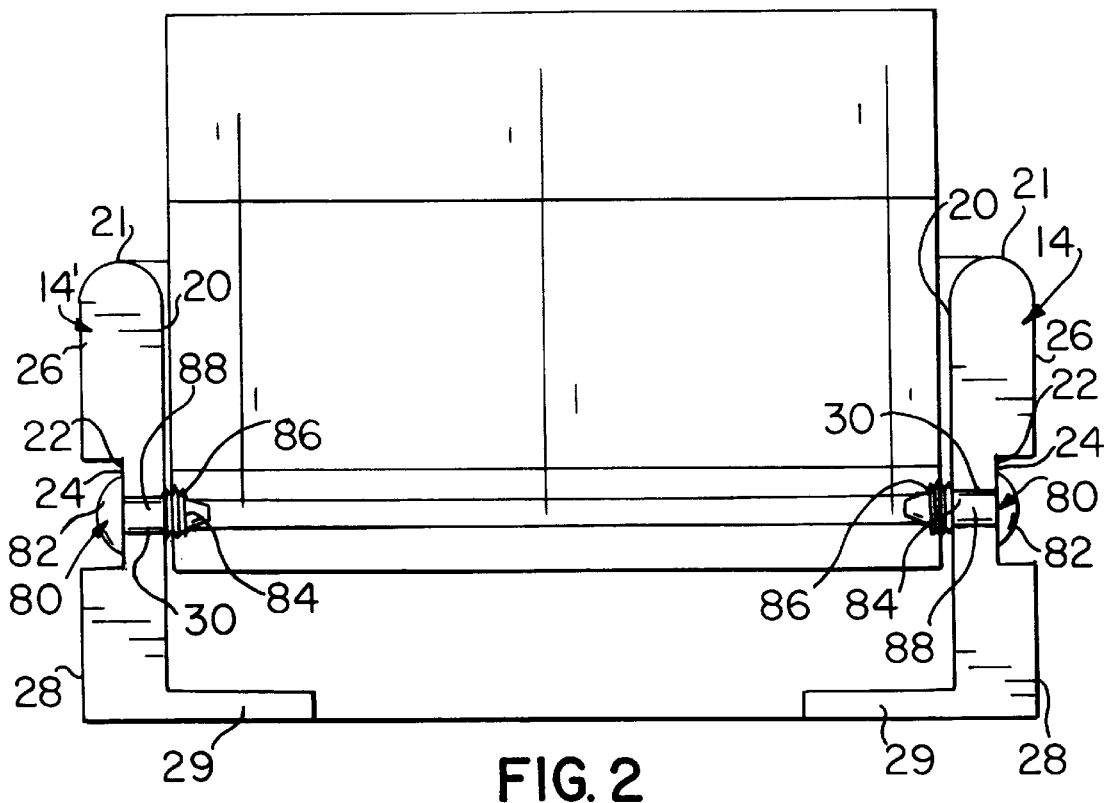
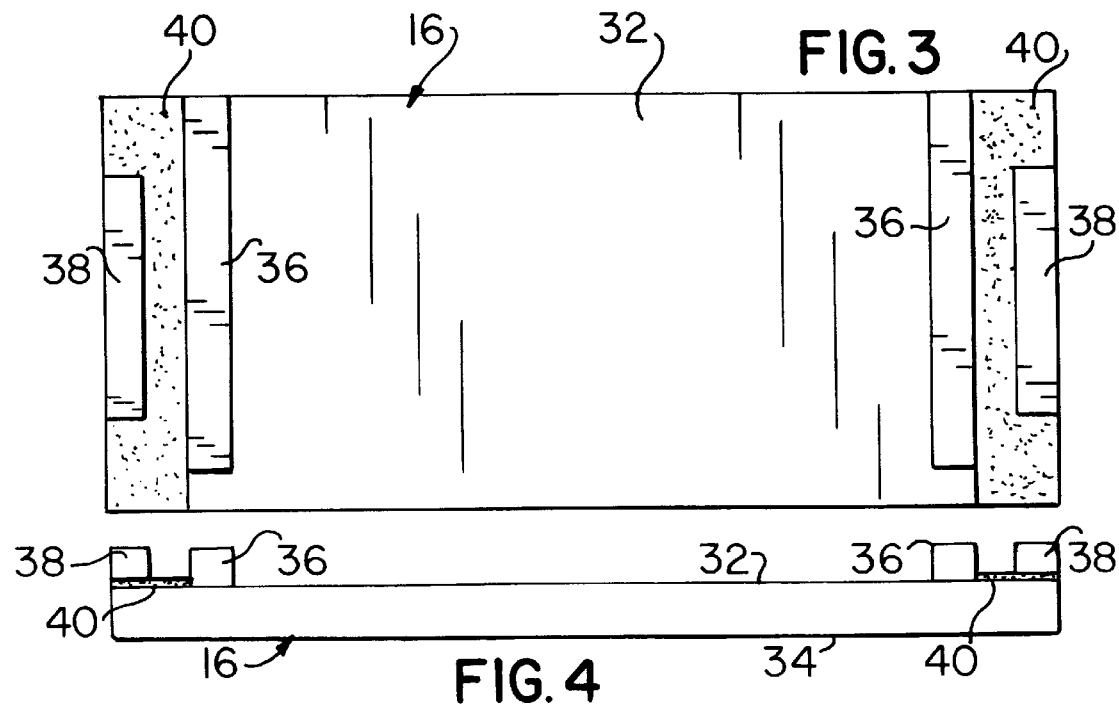

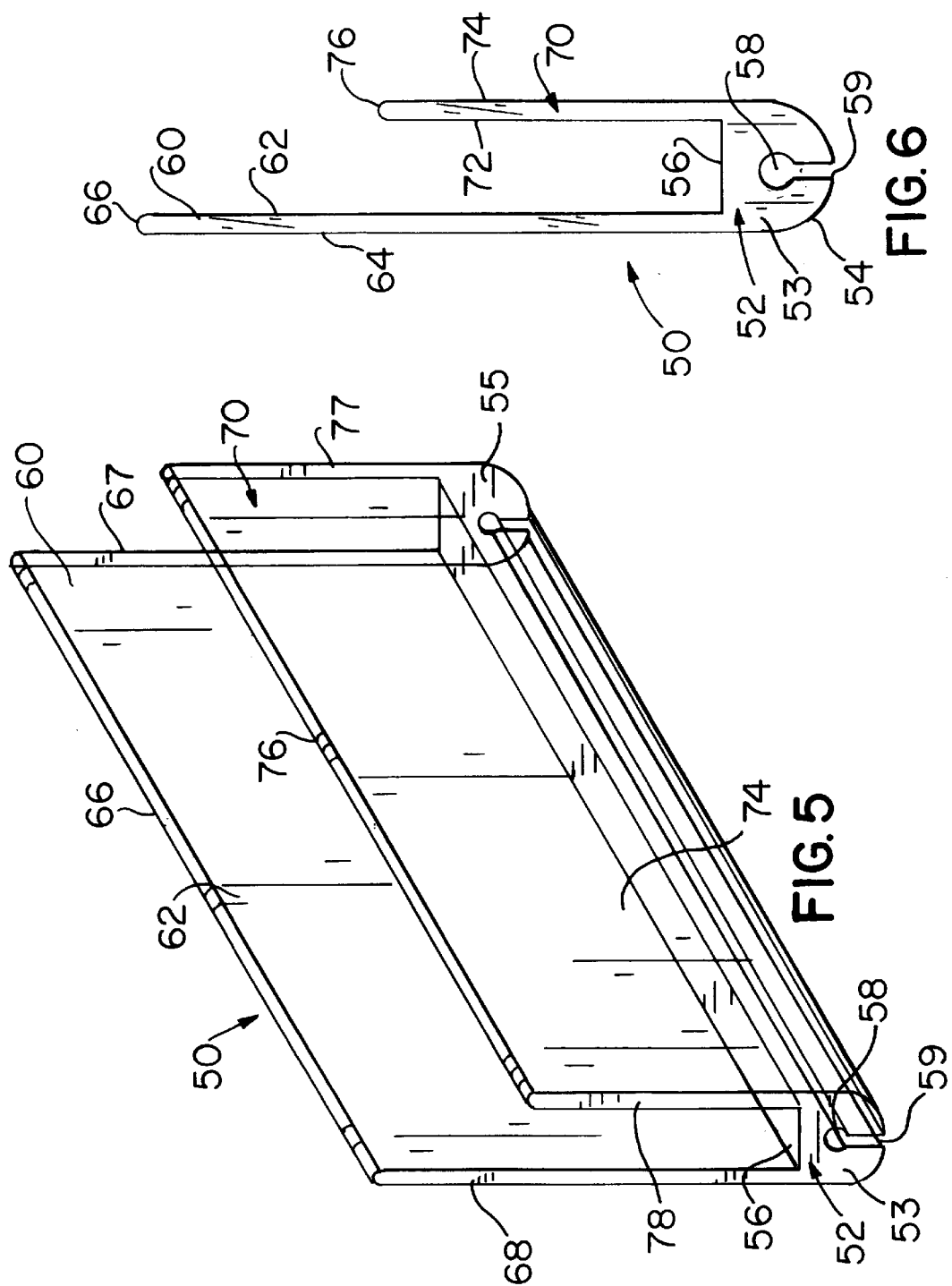

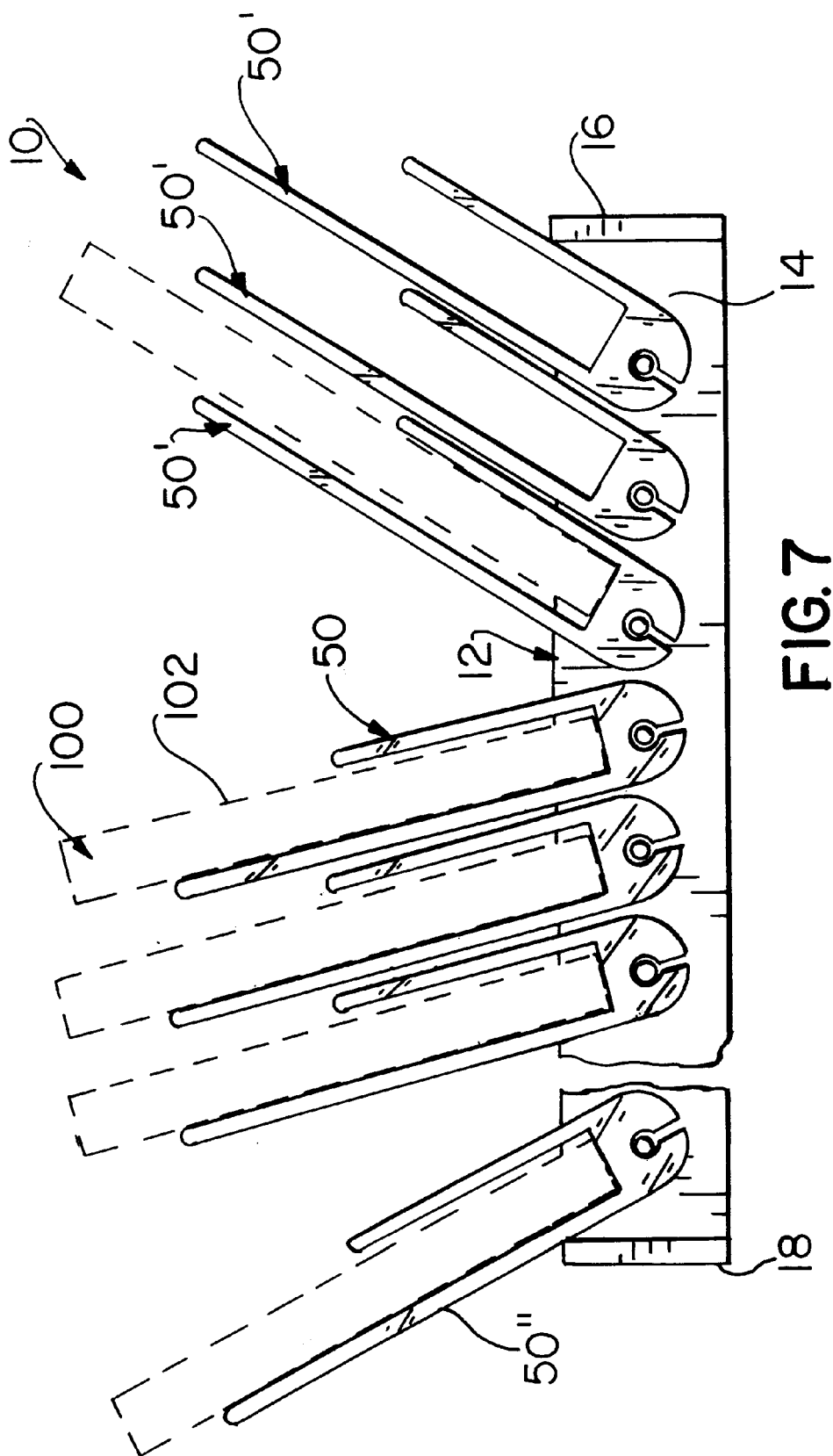

COMPACT DISC STORAGE DEVICE

BACKGROUND OF THE INVENTION

1. Field of the Invention

The present invention relates to storage devices for media units and, more particularly, to a storage device having a plurality of carriers pivotally supported in a series of rows, with each of the carriers having means for holding one or more media units thereon, in an upright position, so that the media units can be easily and quickly identified upon flipping the carriers in each row from a rearwardly inclined position to a forwardly inclined position.

2. Description of the Related Art

The recording of audio, video and other types of data on various types of media is well known and used extensively in many industries including the fields of education, business and entertainment. In particular, music and video is commonly stored on media ranging from compact discs (CD's), DVD's, and CD-roms to cassette tapes and video tape (e.g. VCR tapes). Other types of well known storage media include video game cart ridges and/or cassettes such as those used in the well known and popular Nintendo and Sony play station systems. In professional environments, such as medical and legal practices, microcassettes are commonly used for dictation. And, more recently, the use of mini discs and laser discs as a means to record audio and video have become increasingly widespread. Eventually, most people find the need to store these various individual media units in an organized manner so that they may be retrieved for use at a later date. For instance, anyone with a sizable CD collection knows that it can be a time consuming and often frustrating task to locate a particular album at a moment's notice. Others having an extensive collection of video games, CD-roms, VCR tapes, and the like experience the same challenge when hunting down a favorite game or program.

In an effort to provide a means for organizing and storing media units, such as those described above, various display racks and storage units have been proposed in the related art. Some of these devices are free standing and may be portable, while others are incorporated into home entertainment centers and computer work stations. In general, most of these devices hold the media units in a stationary, fixed position within single slots. The media units are generally inserted into the slots in a horizontal, stacked orientation so that only the narrow end of the media unit, having small print thereon, is exposed for identification. In many instances, display racks and storage units are placed on the floor. This requires a person to bend down or kneel on the floor and struggle to read the tiny print, along the narrow edges of the media units, within inches of the floor. To locate a desired one of the media units, it is usually necessary to search through the entire collection, one by one. Once found, it is difficult to grasp and remove the located media unit from within the stacked display.

Most media products are packaged in a plastic case which has a large front panel for displaying a cover of the product. Typically, a jacket is fitted within the case which includes a large colorful cover which is visible through the front of the case. This packaging method is used in virtually all CD's, cassette tapes, video game discs, and CD-roms. Because the cover is unique to the particular media product within the case, usually displaying the title in large print and graphics or pictures relating to the product (e.g., pictures of a recording artist, musical group, video game character, etc.), the cover is the easiest way to quickly identify the particular media unit that a person is trying to find.

Accordingly, in view of the problems associated with the various display racks/storage units known in the related art, there is a need for an improved storage device which is specifically structured to hold a collection of media units in a generally vertical orientation and in a manner which displays the front cover of each of the media units, thereby providing for easy visual identification and location of each of the individual media units stored within the device.

SUMMARY OF THE INVENTION

The present invention it directed to a storage device for holding a collection of individual media units such as, but not limited to, compact discs, DVD's, CD-roms, mini discs, video game cassettes, VCR tapes, cassette tapes, microcassettes and the like. The storage device includes a frame structure having first and second longitudinal frame members maintained in spaced apart, parallel relation. The frame structure may further include a front frame member and a rear frame member spanning between the parallel longitudinal frame members. A plurality of carriers are supported transversely between the longitudinal frame members in a series of rows. The carriers each include a base and front and rear transparent panels extending upwardly from the base in spiced, parallel relation to one another for holding one or more of the media units other between in a generally upright position. In a preferred embodiment, the carriers are an integral, one-piece unit formed in an extrusion molding process, or other suitable manufacturing technique, wherein the base, front and rear panels are formed of the same material, preferably a transparent plastic. When supported between the longitudinal frame members, the carriers are normally maintained in a rearwardly inclined position and are independently movable, about a transverse pivot axis, through a range of movement between the rearwardly inclined position and a forwardly inclined position. As the carriers in each row are moved from the rearwardly inclined position to the forwardly inclined position, in what may be referred to as a flipping motion, the entire front covers of the media units are visibly exposed in the next successive row, thereby providing for easy visual identification and location of each of the individual media units stored within the device.

With the foregoing in mind, it is a primary object of the present invention to provide a storage device for holding a collection of individual media units therein, wherein the device is specifically structured and disposed to hold each of the media units in a vertical orientation, allowing for easy identification of each of the media units by visibly exposing the print, artwork and other indicia on the front covers.

It is a further object o the present invention to provide a storage device for holding a collection of individual media units, as described above, which is simple to assemble without the use of any tools.

It is still a further object of the present invention to provide a storage device for holding a collection of individual media units, as described above, which can be manufactured and used as a free standing device, a portable device, or in fixed position within a drawer, such as in an entertainment center or computer work station.

It is yet a further object of the present invention to provide a storage device for holding a collection of individual media units, as described above, wherein the media units are held in a series of carriers that allow multiple media units to be stored in each tray, side by side, and in a manner which allows the user to quickly sort/search through the collection to locate a desired one of the media units.

It is still a further object of the present invention to provide a storage device for holding a collection of individual media units, as described above, which is specifically structured to allow the media units to be easily grasped in order to remove and replace the media units within carriers of the device.

These and other objects and advantages of the present invention will be more readily apparent with reference to the detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 2 is a sectional view taken along line 2—2 of FIG. 1;

FIG. 3 is an elevational view of an inner facing side of the front and/or rear frame member of the device;

FIG. 4 is a top plan view of the front frame member of FIG. 3;

FIG. 5 is a perspective view of a carrier of the device;

FIG. 6 is an end elevational view of the carrier; and

FIG. 7 is a side elevation of the storage device, shown with the side longitudinal frame member removed, to illustrate the relative positioning and movement of the carriers between a rearwardly inclined position and a forwardly inclined position.

Like reference numerals refer to like parts throughout the several views of the drawings.

DETAILED DESCRIPTION OF THE PREFERRED EMBODIMENT

Figure 1:
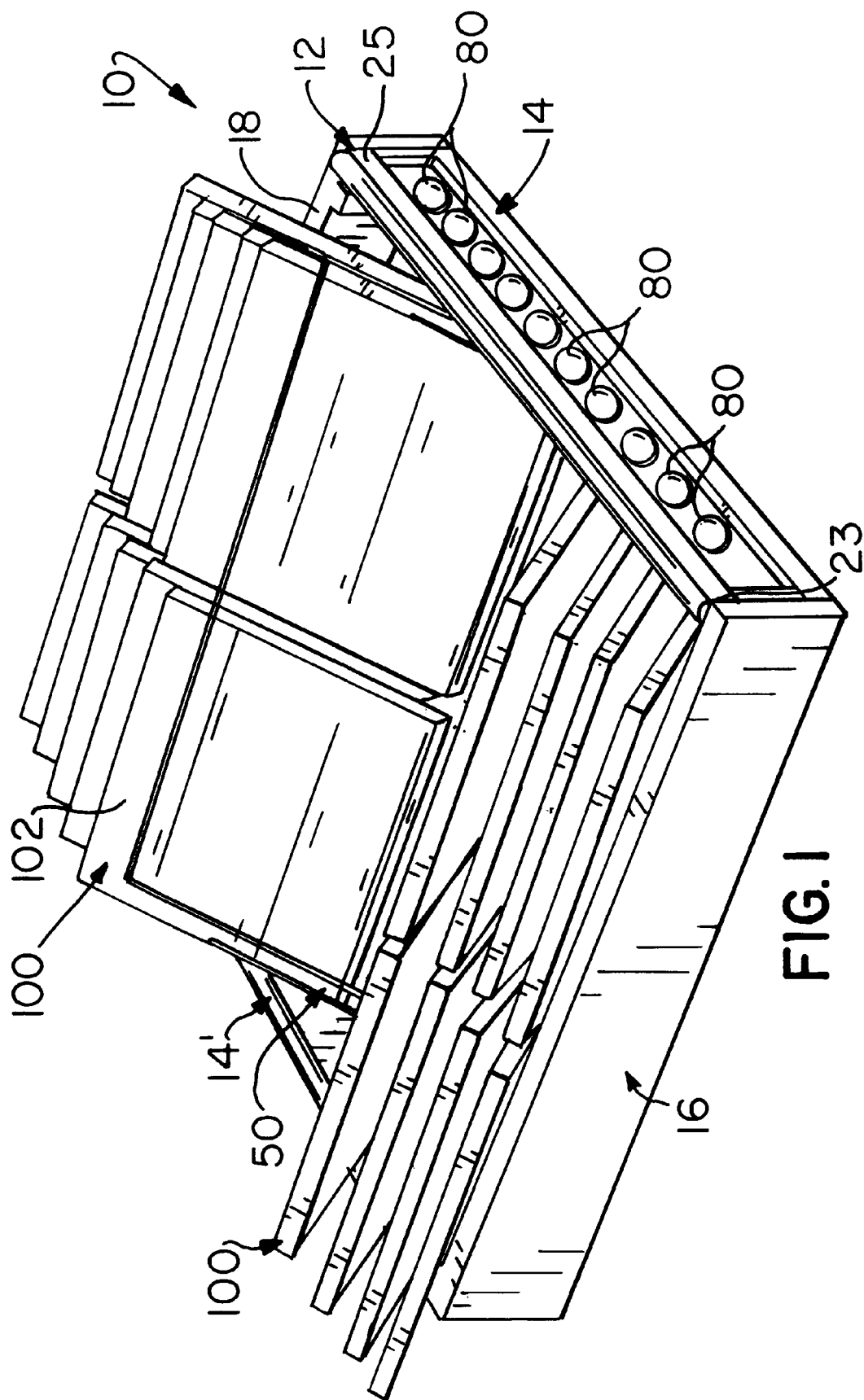
FIG. 1 is a perspective view of the storage device of the present invention.

Referring to the several views of the drawings, the storage device, generally indicated as 10, is shown in accordance with a preferred and practical embodiment thereof.

Referring initially to FIGS. 1 and 2, the storage device 10 is shown to include a frame assembly 12 having a first longitudinal frame member 14 and an opposite second longitudinal frame member 14' positioned in spaced apart, parallel relation to the first longitudinal frame member. The frame assembly 12 may further be provided with a front frame member 16 and a back frame member 18 spanning transversely between the longitudinal frame members 14, 14' to thereby define a square or rectangular frame structure surrounding a storage area.

The longitudinal frame members 14, 14' each include an inner facing side 20, an outer facing side 22, a forward end 23, and a rear end 25. The outer facing side 22 includes a longitudinal recessed channel 24 extending along the length of the longitudinal frame member between the opposite ends 23, 25. The recessed channel 24 is centrally positioned between an upper portion 26 and a lower portion 28, as best seen in FIG. 2. The base of the longitudinal frame members 14, 14' may further be provided with an inwardly directed support or footing 29 to stabilize the frame assembly 12 on a flat support surface. The longitudinal frame members 14, 14' are further provided with a plurality of holes 30 disposed in an equi spaced, linear arrangement along the recessed channel 24. Each of the holes 30 extends through a thickness of the respective frame member 14, 14' communicating between the outer surface 22 and the inner surface 20. Each of the holes in the first longitudinal frame member are specifically positioned so as to be in axial alignment with a correspondingly position one of the holes 30 in the second longitudinal frame member 14', thereby defining a pivot axis extending transversely and generally perpendicularly relative to the longitudinal frame members 14, 14'.

The storage device 10 can be installed within a drawer, such as found in an entertainment center or computer work station. In this instance, the longitudinal frame members 14, 14' may 1e secured to the bottom of the drawer surface or the footing 29 of each longitudinal frame member may be securely attached to the bottom of the drawer using glue, double sided adhesive tape, hardware or other suitable fastening means. The recessed channel 24 is particularly useful in this type of an installation. Specifically, the recessed channels provide for clearance of the heads 82 of pivot fasteners 80 so that the heads 82 do not interfere with the sides of the drawer, thereby enabling the longitudinal frame members to be fitted flush against the inner sides of the drawer. This provides for a neat, efficient installation of the device 10 within the drawer.

The frame assembly 12 of the storage device may further be constructed in a manner which is well suited for use on a table top, desk top, counter or the like. In this instance, it may be desirable to reinforce the frame assembly with front 16 and rear 18 frame members. While FIGS. 3 and 4 show the front frame member 16, it should be understood that the back frame member 18 is essentially identical in structure. Both the front and back frame members 16, 18 include an inner facing side 32, and an outer facing side 34. The inner facing side 32 is provided with rib members 36 and 38 at the opposite ends. The rib members 38 are sized and configured for snug fitted receipt within the recessed channel 24, wherein the front or back frame member 16, 18 is fitted to the longitudinal frame members. Further, the ribs 36 fit snugly against the inner surface 20 and the footing 29. The ribs 36 and 38 serve to reinforce the frame assembly 12, providing structural rigidity. In order to facilitate attachment of the front and back frame members 16, 18 to the respective longitudinal frame members 14, 14' without the use of tools, a double sided adhesive material 40 is provided on the inner facing side 32 of the front and back frame members, at the areas where the inner facing sides 32 engage the ends 23, 25 of the longitudinal frame members. In manufacture, the exposed surface of the double sided adhesive may be provided with a peel away film which is removed at the time of assembly. By fitting the front and back frame members 16, 18 in position against the ends 23, 25 of the longitudinal frame members, so that the ribs 38 are received within the channels 24 of the respective longitudinal frame members, slight pressure is then applied so that the exposed adhesive surface of the double adhesive substance 40 adheres to the exposed surface of the ends 23, 25 of the longitudinal frame members, thereby completing assembly of the frame structure.

As seen in FIGS. 1 and 7, the device 10 includes a plurality of carriers 50 supported transversely between the first and second longitudinal frame members 14, 14' in a series of rows from a front portion of the frame assembly to a rear portion of the frame assembly. The carriers are specifically structured for holding one or more of the media units in a generally upright position. Referring now to FIGS. 5 and 6, one of the carriers 50 is shown in detail and includes an elongate base 52 having a generally rounded bottom portion 54 formed between a rear of the base and a front of the base, and a top support surface 56. The base further includes opposite ends 53 and 55 which are positioned in close, adjacent relation to a respective one of the inner sires 20 of the longitudinal frame members 14, 14'. An axial bore 58 is formed through each of the opposite ends 53, 55 and may extend through the entire length of the base 52. The embodiment shown in the drawings includes an elongate open slot 59 on the bottom of the base and communicating with axial bore 58. This particular structure is ideal for use in manufacture of the carrier by an extrusion molding process. In this instance, the open slot 59 and axial bore 58 would extend through the entire length of the base from end 53 to opposite end 55.

The carrier 50 further includes a rear panel 60 extending upwardly from the base 52 in generally perpendicular relation to the top support surface 56. The rear panel includes an inner face 62, an oppositely disposed outer face 64, a top edge 66, and opposite side edges 67, 68. The distance between the opposite side edges 67 and 68 is preferably the same as the length of the base so that the edges 67, 68 are disposed in close adjacent relation to the inner facing sides 20 of the respective longitudinal frame members 14, 14' as best seen in FIG. 2. The carrier 50 is further provided with a front panel 70 which extends upwardly from the base, generally perpendicular to the top support surface 56, and in spaced, parallel relation to the rear panel 60. The front panel 70 includes an inner face 72 disposed in opposing relation to the inner face 62 of the rear panel 60. The front panel 70 further includes an outer face 74, a top edge 76, and opposite side edges 77, 78. Much like the side edges of the rear panel 60, the side edges 77, 78 of the front panel 70 are spaced at a distance which is preferably equal to the length of the base 52 so that the edges 77, 78 are disposed in close spaced, adjacent relation to the inner facing side 20 of the respective longitudinal frame members 14,14'.

The inner faces 62 and 72 of the front and rear panels are spaced apart from one another at a distance which permits placement and removal of one of the media units therebetween, so that the media unit is held on the carrier while resting on the top support surface 56 of the base 52, with the media unit captivated between the front and rear panels. The carrier 50 may be of a length which permits two or more of the media units to be placed between the front and rear panels in a side by side fashion, thereby increasing the storage capacity of the device by permitting a plurality of media units to be stored in a single row. In a preferred embodiment, the top edge 76 of the front panel 70 is lower than the top edge 66 of the rear panel 60. This exposes a portion of the front of the media unit so that it may be more easily grasped for placement and removal within the carrier 50.

In order to visibly expose the entire front cover 102 of the media unit 100 stored within each of the carriers 50, the front panel is formed of a transparent material. In a preferred embodiment, as shown in the drawings, the entire carrier, including the front and rear panels and base, are formed of a transparent material as an integral, one piece unit.

To pivotally support the carriers 50 between the longitudinal frame members 14, 14', a plurality of pivot fasteners 80 are inserted through the holes 30 so that a portion of the shank 84 is received within the axial bore 50 at each end of the base of the carriers. More specifically, each of the pivot fasteners 80 are provided with an enlarged head 82 and a shank 84. The enlarged head 82 of the pivot fastener is sized and configured to engage the outer facing side 22 of the respective first and second longitudinal frame members 14, 14' surrounding the holes 30, to thereby limit travel of the shank 84 into the axial bore 58 of the carriers. In assembling the device, the shank 84 of each of the pivot fasteners 80 is inserted through a respective one of the holes 30 with the carrier positioned so that the axial bore 58 aligns with the respective opposite holes 30 of the longitudinal frame members 14, 14'. The pivot fasteners 80 are pushed through the holes until the enlarged head 82 engages the outer facing surface 22, thereby indicating that the fastener is fully inserted. As previously mentioned, the head 80 is further structured to protrude outwardly from the outer facing side 22 a distance which does not exceed the depth of the recessed channel 24, so that the surface of the upper and lower portions 26, 28 can be flush against an opposing surface, such as the inside surface of the sides of a drawer. The shank 84 of the pivot fasteners includes a distal end portion which is provided with a plurality of annular skirts. The annular skirts are flexible and are specifically structured to permit insertion of the distal end portion 86 into the axial bore 58 of the carrier 50. The annular skirts on the distal end portion 86 are further structured to resist pullout of the distal end portion 86 once inserted within the axial bore 58. The shank 84 is further provided with a proximal portion 88 which includes a smooth, outer cylindrical surface to freely rotate within the holes 30. In this manner, the carriers 50 are permitted to pivot, relative to the frame structure 12, as the proximal portion 88 of the pivot fasteners 80 rotate within the holes 30.

Referring to FIG. 7, movement of the carriers 50 within the frame structure is generally illustrated, wherein it can be seen that the carriers 50 are removable between a rearwardly inclined position (see carrier 50") and a forwardly inclined position (see carrier 50'). Pivotal movement, in a flipping motion, between the rearwardly inclined position a id the forwardly inclined position, may be limited by various stop means fitted to the carriers 50 and/or the frame structure 12. In the embodiment shown in FIGS. 1 and 7, the front and back frame members 16, 18 provide means for limiting pivotal travel of the carrier members 50. Specifically, the back frame member 18 engages the last carrier 50" as it moves in the rearward pivoting direction, until it rest against the back frame member 18, thereby defining the rearwardly inclined position. The next to the last carrier 50 positioned just forward of the last carrier 50" is pivotally movable in the rearward direction until it comes to rest against the front panel of the last carrier 50", thereby defining the rearwardly inclined position. This sequence is followed through each successive row of carriers. Likewise, the front frame member 16 may be used to define a stop means for limiting forward pivotal movement of the carriers 50. In this instance, as best seen in FIG. 7, the forwardmost carrier 50 is movable in a forward motion until the front panel thereof comes to rest against the front frame member 16, thereby defining the forwardly incline position. Movement of each of the successive carriers 50') in the rows behind the forwardmost carrier is limited to the forwardly inclined position as each of the respective carriers come to rest against the rear panel of the carrier in the adjacent, forwardly positioned row. The carriers 50 are normally positioned in the rearwardly in lined position. When it is desired to search through the storage device 10, for one o more media units stored therein, the carriers can be flipped forwardly from the rearwardly inclined position to the forwardly inclined position. Each time a carrier in a particular row is moved from the rearwardly inclined position to the forwardly inclined position, the front covers of the media units in the next successive carrier, which is still in the rearwardly inclined position, are fully exposed to the user. By continuing this sequence of operation, row by row, the covers of each of the media units stored in the device can be easily viewed for identification. Once located, he particular media unit can be grasped and removed from the carrier for use. When it is desired to replace the media unit within the storage device 50, the empty or partially emptied carrier is easily identified without having to move the carriers. The particular media unit can be replaced back into its respective carrier by simply inserting it down through the top of the carrier between the front and rear panels.

While the instant invention has been shown and described in what is considered to be a preferred and practical embodiment thereof, it is recognized that departures may be made from the instant disclosure which should not be limited except within the spirit and scope of the present invention as set forth in the following claims as interpreted under the doctrine of equivalents.

What is claimed is:

1. A storage device for holding a plurality of media units each having a front cover, said device comprising:

a frame assembly including first and second longitudinal frame members supported in spaced apart, parallel relation to one another, and each having an inner facing side, an outer facing side, a forward end, a rear end, a longitudinal recessed channel extending along said outer facing side, and a plurality of holes disposed in an equi spaced, linear arrangement along said recessed channel, each of said plurality of holes extending through a thickness of said respective first and second longitudinal frame members, and each of said plurality of holes in said first longitudinal frame member being positioned and disposed in axial alignment with a correspondingly positioned one of said holes in said second longitudinal frame member to thereby define a pivot axis;

a plurality of carriers transversely positioned between said first and second longitudinal frame members in a plurality of rows, each of said carriers including:

a base having a lower portion, a top support surface, opposite ends, and an axial bore formed in said opposite ends, said axial bore at each end being positioned and disposed in axial alignment with one of the correspondingly positioned axially aligned holes in said first and second longitudinal frame members to thereby align said axial bore at each end of said base along said pivot axis;

a rear panel extending upwardly from said base, and including an inner face, an outer face, a top edge, and opposite side edges;

a front transparent panel extending upwardly from said base in spaced, parallel relation to said rear panel and including an inner face, an outer face, a top edge and opposite side edges; and said inner faces of said front and rear panels being spaced apart from one another at a distance which permits placement and removal of at least one of the media units therebetween so that the media unit is held on said carrier while resting on said top support surface of said base with at least a portion of the media unit captivated between said front and rear panels and the front cover of the media unit maintained upright and visible through said front panel; and a plurality of pivot fasteners for pivotally supporting said carriers transversely between said longitudinal frame members, each of said pivot fasteners including a head and a shank, said shank being structured and disposed to extend through a respective one of said holes in said first and second longitudinal frame members and into said bore of an adjacently positioned one of said opposite ends of said base of said carrier, and said head of said pivot fastener being sized and configured to engage said outer facing side of said respective first and second longitudinal frame members surrounding said hole to limit travel of said shank into said bore, thereby defining a fully inserted position, and said head being further structured and configured to protrude outwardly from said outer facing side to a distance not exceeding a depth of said recessed channel when said pivot fastener is in the fully inserted position, and said shank including a distal end portion being structured and disposed for fixed attachment within said bore and a proximal portion being structured and disposed to rotate freely within said hole of said respective longitudinal frame member to thereby permit pivotal movement of said carrier about said pivot axis, in a flipping motion, between a forwardly inclined position and a rearwardly inclined position, wherein the front cover of at least one media unit held in a respective one of said carriers is visibly exposed in a selected one of said rows when said carriers in preceding rows, positioned forwardly of said selected row, have been rotated to said forwardly inclined position and the carrier in the selected row is in said rearwardly inclined position.

2. The storage device as recited in claim 1 wherein said frame assembly further includes a front frame member and a back frame member, said front frame member being attached to said forward end of each of said respective longitudinal frame members and said back frame member being attachable to said rear end of each of said respective longitudinal frame members.

3. The storage device as recited in claim 2 wherein said front and back frame members are attachable to said longitudinal frame members with adhesive means.

4. The storage device as recited in claim 3 wherein said adhesive means includes a double sided adhesive means.

5. The storage device as recited in claim 4 wherein said frame assembly is provided with reinforcing means for providing rigidity and stability between said front and back frame members and said first and second longitudinal frame members.

6. The storage device as recited in claim 1 wherein said carriers are structured for holding two or more of the media units in adjacent position, along a common plane along a length of said base.

7. The storage device as recited in claim 1 wherein said carriers are manufactured as an integral, one piece unit.

8. The storage device as recited in claim 7 wherein said carriers are manufactured entirely of a transparent plastic material.

9. A storage device for holding a plurality of media units each having a front cover, said device comprising:

a frame assembly including first and second longitudinal frame members supported in spaced apart, parallel relation to one another, and each having a plurality of holes disposed in an equi-spaced, linear arrangement along a length of said longitudinal frame members, each of said plurality of holes extending through a thickness of said respective first and second longitudinal frame members, and each of said plurality of holes in said first longitudinal frame member being positioned and disposed in axial alignment with a correspondingly positioned one of said holes in said second longitudinal frame member to thereby define a pivot axis;

a plurality of carriers transversely positioned between said first and second longitudinal frame members in a plurality of rows, each of said carriers including:

a base having a lower portion, a top support surface, opposite ends, and an axial bore formed in said opposite ends, said axial bore at each end being positioned and disposed in axial alignment with one of the correspondingly positioned axially aligned holes in said first and second longitudinal frame members to thereby align said axial bore at each end of said base along said pivot axis;

a rear panel extending upwardly from said base, and including an inner face, an outer face a top edge, and opposite side edges;

a front panel extending upwardly from said base in spaced, parallel relation to said rear panel and including an inner face, an outer face, a top edge, and opposite side edges; and said inner faces of said front and rear panels being spaced apart from one another at a distance which permits placement and removal of at least one of the media units therebetween so that the media unit is held on said carrier while resting on said top support surface of said base with at least a portion of the media unit captivated between said front and rear panels and the front cover of the media unit maintained upright and visible through said front panel; and a plurality of pivot fasteners for pivotally supporting said carriers transversely between said longitudinal frame members, each of said pivot fasteners including a head and a shank, said shank being structured and disposed to extend through a respective one of said holes in said first and second longitudinal frame members and into said bore of an adjacently positioned one of said opposite ends of said base of said carrier, and said head of said pivot fastener being sized and configured to engage said outer facing side of said respective first and second longitudinal frame members surrounding said hole to limit travel of said shank into said bore, thereby defining a fully inserted position, and said shank including a distal end portion being structured and disposed for fixed attachment within said bore and a proximal portion being structured and disposed to rotate freely within said hole of said respective longitudinal frame member to thereby permit pivotal movement of said carrier about said pivot axis, in a flipping motion, between a forwardly inclined position and a rearwardly inclined position, wherein the front cover of at least one media unit held in a respective one of said carriers is visibly exposed in a selected one if said rows when said carriers in preceding rows, positioned forwardly of said selected row, have been rotated to said forwardly inclined position and the carrier in the selected row is in said rearwardly inclined position.

10. The storage device as recited in claim 9 wherein said frame assembly further includes a front frame member and a back frame member, said front frame member being attached to said forward end of each of said respective longitudinal frame members and said back frame member being attachable to said rear end of each of said respective longitudinal frame members.

11. The storage device as recited in claim 10 wherein said front and back frame members are attachable to said longitudinal frame members with adhesive means.

12. The storage device as recited in claim 11 wherein said adhesive means includes a double sided adhesive means.

13. The storage device as recited in claim 12 wherein said frame assembly is provided with reinforcing means for providing rigidity and stability between said front and back frame members and said first and second longitudinal frame members.

14. A storage device for holding a plurality of media units each having a front cover, said device comprising:

a frame assembly including first and second longitudinal frame members supported in spaced apart, parallel relation to one another, and each having a plurality of holes disposed in an equi-spaced, linear arrangement along a length of said longitudinal frame members, each of said plurality of holes extending through a thickness of said respective first and second longitudinal frame members, and each of said plurality of holes in said first longitudinal frame member being positioned and disposed in axial alignment with a correspondingly positioned one of said holes in said second longitudinal frame member to thereby define a pivot axis;

a plurality of carriers transversely positioned between said first and second longitudinal frame members in a plurality of rows and including means for holding at least one of the media unit thereon; and a plurality of pivot fasteners for pivotally supporting said carriers transversely between said longitudinal frame members, each of said pivot fasteners including a head and a shank, said shank being structured and disposed to extend through a respective one of said holes in said first and second longitudinal frame members and into one of said carriers, and said head of said pivot fastener being sized and configured to engage said outer facing side of said respective first and second longitudinal frame members surrounding said hole to limit travel of said shank into said bore, thereby defining a fully inserted position, and said shank including a distal end portion being structured and disposed for fixed attachment within said bore and a proximal portion being structured and disposed to rotate freely within said hole of said respective longitudinal frame member to thereby permit pivotal movement of said carrier about said pivot axis, in a flipping motion, between a forwardly inclined position and a rearwardly inclined position, wherein the front cover of at least one media unit held in a respective one of said carriers is visibly exposed in a selected one of said rows when said carriers in preceding rows, positioned forwardly of said selected row, have been rotated to said forwardly inclined position and the carrier in the selected row is in said rearwardly inclined position.

15. The storage device as recited in claim 14 wherein said frame assembly further includes a front frame member and a back frame member, said front frame member being attached to said forward end of each of said respective longitudinal frame members and said back frame member being attachable to said rear end of each of said respective longitudinal frame members.

16. The storage device as recited in claim 15 wherein said front and back frame members are attachable to said longitudinal frame members with adhesive means.

17. The storage device as recited in claim 16 wherein said adhesive means includes a double sided adhesive means.

18. The storage device as recited in claim 17 wherein said frame assembly is provided with reinforcing means for providing rigidity and stability between said front and back frame members and said first and second longitudinal frame members.

* * * * *